US008614286B2

(12) United States Patent
Zhou et al.

(10) Patent No.: US 8,614,286 B2
(45) Date of Patent: Dec. 24, 2013

(54) BIOMASS DERIVED RADIATION CURABLE LIQUID COATINGS

(75) Inventors: Hongying Zhou, Allison Park, PA (US); Mary Ann M. Fuhry, Butler, PA (US); Shan Cheng, Sewickley, PA (US); David R. Fenn, Allison Park, PA (US); Anthony P. Kingera, Pittsburgh, PA (US); Vittorio Montanari, Albany, GA (US); Ronald R. Ambrose, Loganville, GA (US); Gregory J. McCollum, Gibsonia, PA (US); Anthony M. Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 685 days.

(21) Appl. No.: 12/394,785

(22) Filed: Feb. 27, 2009

(65) Prior Publication Data

US 2010/0056705 A1     Mar. 4, 2010

Related U.S. Application Data

(63) Continuation-in-part of application No. 12/202,844, filed on Sep. 2, 2008.

(51) Int. Cl.
*C08G 63/02* (2006.01)

(52) U.S. Cl.
USPC ............ 528/272; 528/302; 528/303; 528/306

(58) Field of Classification Search
USPC .......... 524/599; 528/246, 254, 272, 302, 303, 528/306
See application file for complete search history.

(56) References Cited

U.S. PATENT DOCUMENTS

| | | | |
|---|---|---|---|
| 4,296,947 A | | 10/1981 | Spatz |
| 4,447,594 A * | | 5/1984 | Cohen et al. ................. 528/245 |
| 4,555,319 A * | | 11/1985 | Cohen et al. ................. 522/40 |
| 4,977,207 A | | 12/1990 | Hoefer |
| 5,225,521 A | | 7/1993 | Spinu |
| 5,270,400 A | | 12/1993 | Spinu |
| 5,359,026 A | | 10/1994 | Gruber |
| 5,399,666 A | | 3/1995 | Ford |
| 5,563,206 A | | 10/1996 | Eicken |
| 5,714,573 A | | 2/1998 | Randall |
| 5,849,401 A | | 12/1998 | El-Afandi |
| 6,107,433 A | | 8/2000 | Petrovic |
| 6,538,059 B1 | | 3/2003 | Muller |
| 6,686,435 B1 | | 2/2004 | Petrovic |
| 6,737,477 B1 * | | 5/2004 | Figge ........................... 525/131 |
| 6,747,088 B1 * | | 6/2004 | Schwalm et al. ............. 524/507 |
| 6,833,186 B2 * | | 12/2004 | Perrine et al. ................ 428/329 |
| 6,916,547 B2 | | 7/2005 | Tian |
| 7,084,186 B2 * | | 8/2006 | Okazaki et al. .............. 522/152 |
| 7,256,250 B2 | | 8/2007 | Tuominen |
| 7,261,843 B2 * | | 8/2007 | Knox et al. ................... 252/586 |
| 2003/0032719 A1 * | | 2/2003 | Sapper ......................... 524/589 |
| 2003/0091833 A1 * | | 5/2003 | Baumgart et al. ........... 428/423.1 |
| 2003/0232955 A1 * | | 12/2003 | Melchiors et al. ............ 528/59 |
| 2007/0082192 A1 * | | 4/2007 | Kondo ........................... 428/335 |
| 2008/0004369 A1 | | 1/2008 | Seppala |
| 2008/0039593 A1 * | | 2/2008 | Glockner et al. ............. 525/450 |
| 2008/0176061 A1 | | 7/2008 | Ambrose |

FOREIGN PATENT DOCUMENTS

| | | |
|---|---|---|
| DE | 1520648 | 7/1969 |
| EP | 0293905 | 12/1988 |
| EP | 0640632 A1 | 3/1995 |
| EP | 0778304 E1 | 6/1997 |
| EP | 1849810 A1 | 10/2007 |
| EP | 2065421 | 6/2009 |
| GB | 2164949 A | 4/1986 |
| JP | 62020522 | 1/1987 |
| JP | 08100057 | 4/1996 |
| JP | 20022348366 | 12/2002 |
| JP | 2007-025656 | 2/2007 |
| WO | 92/00336 | 1/1992 |
| WO | 97/27253 | 7/1997 |
| WO | 9950345 | 10/1999 |
| WO | 03/033563 A1 | 4/2003 |
| WO | 2004/096882 | 11/2004 |
| WO | 2006/007591 A1 | 1/2006 |
| WO | WO 2006076974 A1 * | 7/2006 |
| WO | 2007/019051 A1 | 2/2007 |
| WO | 2008029527 | 3/2008 |
| WO | 2009/105625 A | 8/2009 |

OTHER PUBLICATIONS

Peshane, Sunil N. et al., "Oil-modified PUDs: cross-linkable, VOC compliant, cost effective", European Coatings Journal, 2003, pp. 105-110, 88 (3), Vincentz Network, Hannover, Germany.
Shukla, Jignesh M. et al., "Epoxy PUR goes bio", European Coatings Journal, 2006, pp. 38-45, 38 (11), Vincentz Network, Hannover, Germany.
"Modern Polyurethane dispersions for wood and plastic varnishes", European Coatings, May 2007; pp. 102-103, Vincentz Network, Hannover, Germany.
U.S. Appl. No. 12/202,755, filed Sep. 2, 2008, entitled: Crosslinked Coatings Comprising Lactide.
U.S. Appl. No. 12/202,820, filed Sep. 2, 2008, entitled: Radiation Curable Coating Compositions Comprising a Lactide Reaction Product.
U.S. Appl. No. 12/202,859, filed Sep. 2, 2008, entitled: Waterborne Polyurethane Dispersion Comprising Biomass Derived Polyol and Coatings Comprising Same.

(Continued)

*Primary Examiner* — Ling Choi
*Assistant Examiner* — Wenwen Cai
(74) *Attorney, Agent, or Firm* — Diane R. Meyers

(57) ABSTRACT

A radiation curable coating comprising the reaction product of a polyol and a polycarboxylic acid/anhydride is disclosed. The reaction product may be made from at least some biomass derived compound. Coatings wherein this reaction product is further reacted with a hydroxyl-carboxylic acid and/or a compound having a radiation curable moiety are also disclosed, as are substrates coated with any of these coatings.

13 Claims, No Drawings

(56) References Cited

OTHER PUBLICATIONS

U.S. Appl. No. 12/202,801, filed Sep. 2, 2008, entitled: Coating Compositions Comprising the Reaction Product of a Biomass Derived Polyol and a Lactide.

U.S. Appl. No. 12/266,588, filed Nov. 7, 2008, entitled: Radiation Curable Coating Compositions Comprising a Lactide Reaction Product.

U.S. Appl. No. 12/202,844, filed Sep. 2, 2008, entitled: Biomass Derived Radiation Curable Liquid Coatings.

Dimmers, Markus, "Sustaining resources", Polymers Paint Colour Journal, Aug. 2007; pp. 22-24, dmg world media (uk) ltd, Redhill, Surrey, United Kingdom.

"Use of Soybean oil in coatings", Polymers Paint Colour Journal, Mar. 6, 1991; pp. 119-126, vol. 181, No. 4278, dmg world media (uk) ltd, Redhill, Surrey, United Kingdom.

\* cited by examiner

BIOMASS DERIVED RADIATION CURABLE LIQUID COATINGS

CROSS-REFERENCE TO RELATED APPLICATIONS

This application is a continuation-in-part of U.S. patent application Ser. No. 12/202,844, filed Sep. 2, 2008.

FIELD OF THE INVENTION

The present invention is directed to radiation curable liquid coatings comprising a reaction product of a polyol and a polycarboxylic acid/anhydride, wherein, in some embodiments, at least some of the polyol and/or the polycarboxylic acid/anhydride are biomass derived.

BACKGROUND OF THE INVENTION

The price of raw materials used in many manufacturing processes continues to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources. In addition, UV curable coatings are often desired in various industries, particularly those in which it is not desired to subject the substrate to a thermal cure. Examples include the consumer electronics industry (cellular telephones, PDAs, MP3s and the like), certain segments of the automobile industry, the plastics industry, and the wood industry.

SUMMARY OF THE INVENTION

The present invention is directed to a radiation curable liquid coating comprising: the reaction product of a) a polyol; and b) a polycarboxylic acid/anhydride, wherein, in certain embodiments, at least some of a) and/or b) are biomass derived, wherein the polyol is not a condensation reaction product of an acid functional compound and a hydroxy functional compound; and wherein the reaction product comprises ethylenic unsaturation that is derived from a) and/or b), but if derived only from b, b has more than four carbons.

DETAILED DESCRIPTION OF THE INVENTION

The present invention is directed to a radiation curable liquid coating comprising the reaction product of a polyol and a polycarboxylic acid/anhydride, wherein, in some embodiments, at least some of the polyol and/or polycarboxylic acid/anhydride is biomass derived. This reaction product is sometimes referred to herein as the "polyol/polycarboxylic reaction product", the "reaction product" and like terms; the term "polyol/polycarboxylic reaction product" is also used herein broadly to refer to the product resulting from reaction of the polyol/polycarboxylic reaction product with one or more additional components. The polyol/polycarboxylic reaction product itself contains ethylenic unsaturation, which will be known by those skilled in the art as a radiation curable moiety, thereby rendering the coating radiation curable. As used herein, the term "biomass derived" will be understood to be derived from a living or recently living organism for example, plants (including trees) or animals and not from a petroleum-based source.

Any suitable polyol can be used according to the present invention. A polyol will be understood by those skilled in the art as a compound having two or more hydroxy groups. Suitable polyols can include, but are not limited to, small molecules containing more than one hydroxyl group, for example neopentyl glycol, glycerol, isosorbide, pentaerythritol, and/or propanediol, or polymeric polyols such as an acrylic polyol, among others. Suitable polyols are widely commercially available. Particularly suitable polyols have a number average molecular weight as determined by GPC ("Mn") of 500 to 100,000, such as 500 to 10,000. In certain embodiments, the polyols can have hydroxyl values of 20 to 400, such as 40 to 300; in other embodiments, the hydroxyl value can range from 1200 to 2100, such as 1400 to 1900.

In certain embodiments, at least some of the polyol is biomass derived. These polyols can be derived from natural oils such as castor oil, peanut oil, soy bean oil or canola oil. The hydroxyl groups present in the biomass derived polyols can be naturally occurring or they can be introduced, for example by modification of carbon-carbon double bonds present in the oils. Natural oil derived polyols are described in United States Patent Application Publication Number 2006/0041156 A1, U.S. Pat. No. 7,084,230, WO 2004/096882 A1, U.S. Pat. Nos. 6,686,435, 6,107,433, 6,573,354 and 6,433,121, all of which are incorporated in their entirety herein. Methods of modifying carbon-carbon double bonds to introduce hydroxyl groups include treatment with ozone, air oxidation, reaction with peroxides or hydroformylation (as described in "Polyols and Polyurethanes from Hydroformylation of Soybean Oil", Journal of Polymers and the Environment, Volume 10, Numbers 1-2, pages 49-52, April, 2002, incorporated herein in its entirety). A particularly suitable biomass derived polyol is a soy polyol. Soy polyols are commercially available from Cargill Inc., Urethane Soy Systems Co. and BioBased Technologies. In certain embodiments, the ethylenic unsaturation in the reaction product can be derived from the polyol; that is, the polyol has ethylenic unsaturation that does not react in the formation of the reaction product.

In certain embodiments, combinations of polyols can be used. In a particularly suitable embodiment, the polyol comprises propanediol and glycerol; the propanediol can be 1,3-propanediol. Any suitable ratio of 1,3-propanediol to glycerol can be used such as 9:1 to 1:9, 4:1 to 1:4, 1.5:1 to 1:1.5, 1:1 and the like.

The polyol used according to the present invention is not the condensation reaction product of an acid functional compound and a hydroxyl functional compound. An acid functional compound as used in this context refers to any compound having one or more acid functional groups, and optionally one or more additional functional groups. A hydroxyl functional compound as used in this context refers to any compound having one or more hydroxyl functional groups, and optionally one or more additional functional groups. If an acid functional compound and hydroxyl functional compound are used in the formation of the polyol used in the present invention, they do not react via condensation polymerization, but rather react by ring opening polymerization.

Any suitable polycarboxylic acid/anhydride can be used according to the present invention. It will be understood by those skilled in the art that a polycarboxylic acid is one that has two or more acid functional groups, or residues thereof, such as anhydride groups. Suitable polycarboxylic acid/anhydrides include maleic acid/anhydride, fumaric acid, and itaconic acid/anhydride. In certain embodiments, the polycarboxylic acid/anhydride is a biomass derived polycarboxylic acid/anhydride. A suitable example includes itaconic acid/anhydride, which is commercially available from Cargill, Aldrich, Acros and the like. Thus, the ethylenic unsaturation in the reaction product can be derived from the polycarboxylic acid/anhydride. If the ethylenic unsaturation is derived only from the polycarboxylic acid/anhydride, that acid/anhydride has more than four carbons. An example of an acid/anhydride with more than four carbons is itaconic acid/anhydride.

In certain embodiments, the polyol/polycarboxylic reaction product is further reacted with a hydroxyl-carboxylic acid. Any suitable hydroxyl-carboxylic acid can be used according to the present invention. It will be understood by those skilled in the art that a hydroxyl-carboxylic acid is one that has one or more acid functional groups, and one or more hydroxyl groups and is sometimes called a hydroxy acid. A suitable example includes 12-hydroxystearic acid, which is commercially available from Arizona Chemical Co.

It will be appreciated that the polyol and/or polycarboxylic acid/anhydride residue or moiety that is in the present reaction product has ethylenic unsaturation that renders a coating comprising the reaction product radiation curable. In certain embodiments, the polyol/polycarboxylic reaction product is further reacted with another compound having a radiation curable moiety. This reaction can take place by any means standard in the art, such as through esterification or a hydroxy/NCO reaction. Suitable compounds having a radiation curable moiety include (meth)acrylates. As used herein, and as is conventional in the art, "(meth)acrylate" refers to both acrylate and the corresponding methacrylate. Examples of suitable compounds that can be further reacted with the polyol/polycarboxylic reaction product include, but are not limited to, acryloyl isocyanates including isophorone diisocyanate-hydroxyethyl acrylate adduct, and isocyanatoethyl (meth)acrylate ("AOI").

As a result, certain embodiments of the present invention are directed to liquid, radiation curable coating compositions comprising an unsaturated polyester urethane oligomer that is the reaction product of reactants comprising: (a) a polyol; (b) a polycarboxylic acid/anhydride; and (c) an acrylol isocyanate. In these embodiments, it is optional that one or more of the reactants may comprise biomass derived material.

In certain embodiments, any of the polyol/polycarboxylic reaction products described herein may contain 50 weight percent or greater biomass derived material, such as 80 weight percent or greater or 90 weight percent or greater, with weight percent based on total solid weight. It will be appreciated that the biomass derived material can be a result of either biomass derived polyol, biomass derived polycarboxylic acid/anhydride, or both. When using a hydroxyl-carboxylic acid, that may also be biomass derived.

As noted above, the polyol used according to the present invention does not comprise the condensation product of an acid functional component and a hydroxy functional component. Thus, the only polycarboxylic acid/anhydride residue in the reaction product of components a) and b) as described herein derives from component b, the polycarboxylic acid/anhydride. The reaction product of a) and b) can, however, be further reacted with other polycarboxylic acid/anhydrides. Such an embodiment is therefore explicitly within the scope of the present invention.

As noted above, the use of the present polyol/polycarboxylic reaction product in a coating renders the coating radiation curable. A radiation curable coating will be understood as one that is cured by exposure to radiation, such as actinic radiation, examples of which include UV and electron beam radiation. When the polyol/polycarboxylic reaction product, which is itself radiation curable, is further reacted with a compound having a radiation curable moiety, the resulting polyol/polycarboxylic reaction product may have increased cure rate of the material, and may have increased crosslink density of the cured film. The increased crosslink density may contribute to improved film properties such as hardness and/or abrasion resistance.

It will be appreciated that when the present polyol/polycarboxylic reaction product is used in a coating according to the present invention, it can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water based or solvent based liquid compositions.

Thermosetting or curable coating compositions typically comprise film forming polymers or resins having functional groups that are reactive with either themselves or a crosslinking agent. The additional film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

If an additional thermosetting film former is used in the coating composition, it may be self-crosslinking, that is, it may have functional groups that are reactive with themselves, or a crosslinking agent may be added. The crosslinking agent can comprise polyisocyanates, aminoplasts, polyepoxides, beta hydroxyalkylamides, polyacids, and hydrides, organometallic acid-functional materials, polyamines, polyamides, and mixtures of any of these.

When a crosslinker is used, the coatings of the present invention can comprise 5 to 60 weight %, such as 10 to 50, or 20 to 40 weight %, based on total solids weight, of crosslinker.

It will be appreciated that the coatings of the present invention may further comprise an additional film-forming resin that is thermoplastic or thermosetting, and, therefore, the coating may be "dual cure". That is, the coating will cure via the radiation curable moieties and also will cure via another mechanism. Alternatively, the polyol/polycarboxylic reaction products described herein can be further reacted with components having functionality that will render the reaction product itself dual cure. In certain embodiments, the reaction product can comprise a radiation curable moiety and a hydroxy group, for example, which can be further reacted with an appropriate crosslinker. As used herein, the term "thermoplastic and/or thermosetting moiety" and like terms refers to an additional film-forming resin that is thermoplastic or thermosetting, and/or functionality on the reaction product itself that renders the reaction product capable of thermosetting cure.

In certain embodiments, the coating compositions of the present invention comprise additional radiation curable materials beyond the polyol/polycarboxylic reaction products described above. In certain embodiments, such materials comprise a (meth)acrylate functional material.

In certain embodiments, such as, for example, those embodiments comprising the unsaturated polyester urethane oligomer described earlier, the liquid radiation curable coating compositions of the present invention comprise a highly functional (meth)acrylate which, as used herein, refers to monomers, oligomers, and/or polymers comprising four or more reactive (meth)acrylate groups per molecule.

Suitable highly functional (meth)acrylates include, without limitation, tetra functional (meth)acrylates, such as, for example, di-trimethylolpropane tetraacrylate, ethoxylated 4-pentaerythritol tetraacrylate, pentaerythritol ethoxylate tetraacrylate, pentaerythritol propoxylate tetraacrylate, including mixtures thereof; penta functional (meth)acrylates, such as, for example, dipentaerythritol pentaacrylate, dipentaerythritol ethoxylate pentaacrylate, and dipentaerythritol propoxylate pentaacrylate, including mixtures thereof; and hexa functional (meth)acrylates, such as the commercially available products EBECRYL 1290 and EBECRYL 8301 hexafunctional aliphatic urethane acrylate (both available from UCB Chemicals); EBECRYL 220 hexafunctional aromatic urethane acrylate (available from UCB Chemicals); EBECRYL 830, EBECRYL 835, EBECRYL 870 and EBECRYL 2870 hexafunctional polyester acrylates (all available from UCB Chemicals); EBECRYL 450 fatty acid modified polyester hexaacrylate (available from UCB Chemicals); DPHA dipentaerythritol hexaacrylate (functionality 6; available from UCB Chemicals); and mixtures of any of the foregoing.

In certain embodiments, the present invention is directed to coating compositions comprising a combination of the unsaturated polyester urethane oligomer described earlier and a highly functional (meth)acrylate. In some cases, such coating compositions comprise: (a) 10 to 99, such as 20 to 90, or, in some cases, 30 to 80, or 40 to 70 percent by weight of the polyester urethane (meth)acrylate, based on the total solids weight of the composition; and (b) 1 to 50, such as 10 to 40, or, in some cases, 20 to 35 percent by weight of highly functional (meth)acrylate, based on the total weight of the composition. Indeed, it has been discovered that, in at least some cases, such compositions are capable of producing highly abrasion resistant coatings even in the substantial or complete absence of the abrasion resistant particles described herein. As used herein, the term "substantial absence" when used in reference to the absence of abrasion resistant particles, means that the composition comprises less than 10 percent, such as less than 5 percent, less than 2 percent, or, in some cases, less than 1 percent by weight of such particles, based on the total solids, i.e., non-volatiles, weight of the coating composition. As used herein, the term "complete absence" when used in reference to the absence of abrasion resistant particles in the coating composition, means that the composition contains no such particles at all.

As used herein, the term "highly abrasion resistant coating" refers to a cured coating that has a % haze of less than 15%, in some cases less than 10%, when measured after 100 taber abrasion cycles in accordance with a standard Taber Abrasion Test (ASTM D 1044-49 modified by using the conditions described in the Examples). In certain embodiments, the cured coatings of the present invention also have a % haze of less than 25%, in some cases less than 20%, when measured after 300 taber abrasion cycles in accordance with a standard Taber Abrasion Test (ASTM D 1044-49 modified by using the conditions described in the Examples NSI/SAE 26.1-1996). In addition, such coatings may also exhibit excellent initial clarity at film thicknesses up to 2 mil, which means that the cured coating has an initial % haze, prior to any Taber abrasion, of less than 1%.

In certain embodiments, the coating compositions of the present invention also comprise a lower functional (meth) acrylate, which, as used herein, refers to mono, di and tri functional (meth)acrylates. Examples of such compounds, which are suitable for use in the present invention, are butanediol dimethacrylate, 1,3-butylene glycol diacrylate, 1,3-butylene glycol dimethacrylate, cyclohexane dimethanol diacrylate, cyclohexane dimethanol dimethacrylate, diethylene glycol diacrylate, diethylene glycol dimethacrylate, ethoxylated bisphenol A diacrylate, ethylene glycol dimethacrylate, 1,6 hexanediol diacrylate, 1,6 hexanediol dimethacrylate, neopentyl glycol diacrylate, neopentyl glycol dimethacrylate, polyethylene glycol diacrylate, propoxylated 2 neopentyl glycol diacrylate, tetraethylene glycol diacrylate, tetraethylene glycol dimethacrylate, triethylene glycol diacrylate, triethylene glycol dimethacrylate, tripropylene glycol diacrylate, propoxylated glyceryl triacrylate, ethoxylated trimethylolpropane triacrylate, pentaerythritol triacrylate, propoxylated glyceryl triacrylate, propoxylated trimethylolpropane triacrylate, trimethylolpropane triacrylate, trimethylolpropane trimethacrylate, tris(2-hydroxy ethyl)isocyanurate triacrylate, Bisphenol A ethoxylate diacrylate containing from 2 to 20 ethoxy groups, Bisphenol A propoxylate diacrylate containing from 2 to 20 propoxy groups, Bisphenol A alkoxylated diacrylate containing a mixture of from 2 to 20 ethoxy and propoxy groups.

In certain embodiments, the total amount of lower functional (meth)acrylate present in the coating compositions of the present invention is up to and including 30, such as up to and including 20 percent by weight, with the weight percents being based on the total solids weight of the composition.

If desired, the coating compositions can comprise other optional materials well known in the art of formulating coatings in any of the components, such as colorants, plasticizers, anti-oxidants, hindered amine light stabilizers, UV light absorbers and stabilizers, surfactants, flow control agents, thixotropic agents, fillers, organic cosolvents, abrasion resistant particles, reactive diluents, catalysts, grind vehicles, and other customary auxiliaries.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges. Silica nanoparticles are particularly suitable. Such nanoparticles may be introduced as a dispersion, such as a dispersion in a radiation curable monomer or a dispersion in an organic solvent.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference in its entirety. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. patent application Ser. No. 10/876,031 filed Jun. 24, 2004, which is incorporated herein by reference in its entirety, United States Patent Application Publication Number 2005-0287348 A1, filed Jun. 24, 2004, and United States Patent Application Publication Number 2006-0251897 filed Jan. 20, 2006, which are also incorporated herein by reference in their entirety.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference in its entirety. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. patent application Ser. No. 10/892,919 filed Jul. 16, 2004, and incorporated herein by reference in its entirety.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

Because the coating compositions of the present invention are liquid, they may also comprise a solvent and/or reactive diluent; alternatively, they may be 100% solids. Suitable solvents include water, organic solvent(s) and/or mixtures thereof. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvents can be biomass derived. Examples of biomass derived solvents include esters of lactic acid and esters of soybean oil fatty acid. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent. In some embodiments, some or all of the solvent may be a reactive diluent that will co-cure with the other components in the formula. The reactive diluent can be biomass derived.

The compositions of the present invention may also further comprise a photoinitiator, such as one standardly used in the art to catalyze or accelerate cure if such cure is by exposure to ultraviolet radiation. Any suitable photoinitiator can be used, including any of the known photoinitiators such as benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxy-acetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert.butylbenzophenone, isobutyl ether-benzoic acetate, benzil benzilic acid, amino benzoate, methyl blue, 2,2-diethoxyacetophenone, 9,10-phenanthrenequinone, 2-methyl anthraquinone, 2-ethyl anthraquinone, 1-tert.butylanthraquinone, 1,4-naphthaquinone, isopropylthioxanthone, 2-isopropylthioxanthone, 2-methylthioxanthone, 2-decylthioxanthone, 2-dodecylthioxanthone, 2-methyl-1,[4-(methyl thio)phenyl]-2-morpholinopropanone-1, combinations thereof and the like.

The present coatings can be applied to any substrates known in the art, for example automotive substrates and industrial substrates. These substrates can be, for example, metallic or non-metallic, including polymeric, plastic, polycarbonate, polycarbonate/acrylobutadiene styrene ("PC/ABS"), polyamide, wood, veneer, wood composite, particle board, medium density fiberboard, cement, stone, and the like. In a particularly suitable embodiment of the present invention, the substrate itself is biodegradable. Biodegradable substrates include, for example paper, wood and biodegradable plastics such as cellulose, poly(lactic acid), poly(3-hydroxybutyrate) and starch based plastics. In addition, the substrate can be one that has been recycled. The substrate can also be one that has already been treated in some manner to impart color or other visual effect. For example, a wood substrate that has been stained may then be coated according to the present invention, as can a substrate that has already had one or more other coating layers applied to it.

As used herein, the term "polyamide" in reference to a substrate means a substrate constructed from a polymer that includes linkages of the formula:

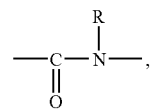

wherein R is hydrogen or an alkyl group. The polyamide may be any of a large class of polyamides based on aliphatic, cycloaliphatic, or aromatic groups in the chain. They may be formally represented by the products of condensation of a dibasic amine with a diacid and/or diacid chloride, by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. In certain embodiments, the polyamide substrate comprises a crystalline polyamide of alkylene repeating units having from 4 to 12 carbon atoms, such as poly(caprolactam) (nylon 6), poly(lauryllactam) (nylon 12), poly(omega-aminoundecanoic acid) (nylon 11), poly(hexamethylene adipamide) (nylon 6.6), poly(hexamethylene sebacamide) (nylon 6.10), and/or an alkylene/arylene copolyamide, such as that made from meta-xylylene diamine and adipic acid (nylon MXD6). The term "nylon" includes all of these products as well as any other compound referred to in the art as nylon. Amorphous polyamides, such as those derived from isophoronediamine or trimethylcyclohexanediamine, may also be utilized. Blends of polyamides may also be utilized.

As used herein, the term "polyamide", when used in reference to a substrate, includes a reinforced polyamide substrate; a reinforced polyamide substrate is a polyamide substrate constructed from a polyamide that has been reinforced through the inclusion of, for example, fibrous materials, such as glass fiber or carbon fiber, or inorganic fillers, such as calcium carbonate, to produce a polyamide having increased rigidity, strength, and/or heat resistance relative to a similar polyamide that does not include such reinforcing materials. Reinforced polyamides that are suitable for use as a substrate material in accordance with certain embodiments of the present invention are commercially available and include, for example, those materials commercially available from Solvay Advanced Polymers under the IXEF name and, include, for example, the IXEF 1000, 1500, 1600, 2000, 2500, 3000 and 5000 series products; from EMS-Chemie Inc., Sumter, S.C., under the GRILAMID, GRIVORY, GRILON and GRILFLEX tradenames; and DuPont Engineered Polymers, such as those sold under the THERMX and MINLON tradenames.

The coatings of the present invention can be applied by any means standard in the art, such as electrocoating, spraying, electrostatic spraying, dipping, rolling, brushing, and the like.

The coatings can be applied to any dry film thickness, such as 0.1 to 2.0 mils, 0.2 to 0.8 mils or 0.3 to 0.6 mils. The coatings of the present invention can be used alone, or, as noted above, in combination with other stains and/or coatings. For example, the coating can comprise a colorant or not and can be used as a primer, basecoat, top coat, automotive repair coat and the like. For substrates coated with multiple coatings, one or more of those coatings can be coatings as described herein. In certain embodiments, the coating of the present invention will be a clearcoat applied on top of one or more other coatings.

The radiation curable coatings of the present invention can be cured upon exposure to high energy or actinic radiation. A class of high energy bombardment includes energetic electrons such as those derived from isotopes such as strontium-90, or intense electron beams produced by particle accelerators. Electron beam curing is most useful in applications where very rapid and economical rates are desired. In some systems, curing periods of less than about one second may be used, which is a total radiation dose of less than about 0.25 megarads.

A class of actinic radiation useful according to the present invention is ultraviolet light; also suitable are other forms of actinic radiation that are normally found in radiation emitted from the sun or from artificial sources such as Type RS Sunlamps, carbon arc lamps, xenon arc lamps, mercury vapor lamps, tungsten halide lamps, and the like. Ultraviolet radiation may be used most efficiently if the coating comprises a photocuring rate accelerator. Curing periods of from 1 second to 15 minutes are typical.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein, including the claims, to "a" polyol, "a" polycarboxylic acid/ anhydride, "a" polyol/polycarboxylic reaction product, "a" hydroxyl-carboxylic acid, "a" crosslinker, "a" compound having "a" radiation curable moiety, and the like, one or more of each of these and any other components can be used. "Including" means "including, but not limited to". As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

Polyesters—1-5 were made as follows:

TABLE 1

| Ingredients | | 1 | 2 | 3 | 4 | 5 |
|---|---|---|---|---|---|---|
| 1,3-Propanediol[1] | Charge #1 | 23.62 | 29.79 | 38.20 | 43.64 | 38.77 |
| Glycerol[2] | | — | 30.81 | 18.69 | 9.49 | — |
| Xylene | | — | — | 5.11 | 5.32 | 6.22 | 5.07 |
| MIBK | | 4.89 | — | — | — | — |
| 12-hydroxy stearic acid[3] | | — | — | — | — | 9.65 |

TABLE 1-continued

| Ingredients | | 1 | 2 | 3 | 4 | 5 |
|---|---|---|---|---|---|---|
| Itaconic acid[4] | Charge #2 | 48.23 | 46.41 | 47.23 | 49.74 | 46.14 |
| IONOL | | 0.134 | 0.12 | 0.13 | 0.10 | 0.09 |
| Butyl-stannoic acid | | 0.195 | 0.19 | 0.19 | 0.20 | 0.18 |
| Triphenyl-phosphite | | 0.123 | 0.03 | 0.10 | 0.10 | 0.09 |
| Acid value | | 6.6 | 2.3 | 2.3 | 1.49 | 3.2 |
| Hydroxyl value | | 521 | 426 | 349 | 236.0 | 195.0 |

[1]Commercially available from DuPont-Tate&Lyle, Inc.
[2]Commercially available from Cargill, Inc.
[3]Cenwax-A brand commercially available from Arizona Chemicals.
[4]Commercially available from Cargill, Inc.

Charge #1 was added into a 5-liter, 4-necked flask equipped with a motor-driven steel stir blade, a nitrogen inlet, a thermocouple, heated by a mantle controlled by the thermocouple via a temperature feedback control device, and set up for azeotropic distillation with a Dean-Stark trap topped by a water-cooled condenser. A column packed with ceramic helixes was fitted between the flask and the Dean-Stark trap to provide additional control of the rate of azeotropic distillation.

Stirring and a nitrogen flow of 0.2 scft/min were started, and Charge #2 was added to produce a suspension. Heating was then started with the temperature set to 140° C. When the internal temperature reached 133-135° C., water and xylene began to collect in the Dean-Stark trap. The water collecting at the bottom of the trap was withdrawn at intervals of about 10 min, and the temperature setting was increased by 5-degree intervals when needed to maintain a steady reflux and to collect approximately 1 gram water per minute until a temperature of 180° C. was reached. At this point, no more water collected in the trap and the acid value fell. The reaction was allowed to cool to 100° C., then xylene was evaporated under a vacuum of 5 to 9 inches of mercury.

Example 2

Urethane-acrylates—1-4 were made as follows:

TABLE 2

| Ingredients | | 1 | 2 | 3 | 4 |
|---|---|---|---|---|---|
| Polyester | Charge #1 | 301.0 (polyester 1) | 49.52 (polyester 2) | 55.95 (polyester 3) | 62.58 (polyester 4) |
| AOI[5] | Charge #2 | 374.5 | 50.41 | 44 | 37.36 |
| IONOL | | 0.5 | 0.07 | 0.06 | 0.6 |
| Acid value | | ND | 1.3 | ND | ND |
| Hydroxyl value | | ND | 18 | 22.4 | 9.9 |
| Unsaturation equivalent weight (g/eq) | | ND | 199 | ND | ND |

[5]Acryloyl Oxyethyl Isocyanate - Versatile Monomer, commercially available from Showa Denko of Japan.
ND = not determined Charge #1, consisting of the corresponding polyesters of Example 1, was added into a 2-liter, 4-necked flask equipped with a motor-driven steel stir blade, a water-cooled condenser, a thermocouple, a sparge tube that delivered a nitrogen-air mixed stream under the surface of the reaction mixture, and an oxygen probe to measure the oxygen content of the gas phase in the head space. Stirring and a nitrogen-air flow of 0.2 scft/min were started, and the nitrogen-air flows adjusted to a 5% vol/vol concentration of oxygen in the headspace.

When the oxygen concentration was stable at 5%, Charge #2 was added dropwise at such a rate as to keep the temperature below 80° C., such as at 50 to 70° C.

When Charge #2 was complete, the final reaction temperature of 70° C. began to subside, indicating that AOI had reacted rapidly while it was added. After 15 minutes, the NCO content was monitored by IR. The band at 2267 cm^−1 was absent.

The product was poured into unlined metal cans.

Example 3, 4, 5

Radiation curable coating compositions of examples 3, 4, and 5 were prepared from the ingredients listed in Table 3. Charge V was added to the flask followed by Charge I and Charge II under agitation. Then Charge III and IV were added in order under agitation. The mixture was stirred for an appropriate time to form a clear solution. The resulting combination was filtered twice with a 0.45 μm filter.

TABLE 3

| | | Formula Weight (g) | | |
|---|---|---|---|---|
| Charge | Component | Example 3 | Example 4 | Example 5 |
| I | Urethane-acrylate 4 from Example 2 | 28.41 | — | — |
| | Urethane-acrylate 3 from Example 2 | — | 28.41 | — |
| | Urethane-acrylate 2 from Example 2 | — | — | 284.10 |
| II | DARACURE 1173[6] | 1.38 | 1.38 | 13.77 |
| | IRGACURE 184[7] | 1.02 | 1.02 | 1.46 |
| | GENOCURE MBF[8] | 0.17 | 0.17 | 1.51 |
| | Benzophenone | 0 | 0 | 10.20 |
| | TINUVIN 123[9] | 0 | 0 | 0.6 |
| III | PM Acetate | 5.71 | 5.71 | 57.10 |
| | n-butyl acetate | 20.0 | 20.0 | 200 |
| | Isobutanol | 14.29 | 14.29 | 142.9 |
| IV | MODAFLOW 2100[10] | 0 | 0 | 1.20 |
| | TEGOrad 2100[11] | 0.60 | 0.60 | 6.0 |
| V | NANOCRYL C150[12] | 28.41 | 28.41 | 284.10 |

[6]Photoinitiator commercially available from CIBA Specialty Chemicals.
[7]Photoinitiator commercially available from CIBA Specialty Chemicals.
[8]Photoinitiator commercially available from Rahn, Inc.
[9]Hindered amine light stabilizer commercially available from CIBA Specialty Chemicals.
[10]Flow modifier commercially available from Cytec Surface Specialties.
[11]Flow modifier commercially available from Tego Chemie, Essen, Germany.
[12]Silica organo sol commercially available from Hanse Chemie AG, Geesthacht that is a 50/50 weight percent dispersion of amorphous silica particles having an average primary particle size of about 20 nanometers in trimethylolpropane triacrylate.

To coat samples with foregoing compositions, MAKROLON transparent polycarbonate plaques (Bayer AG) were wiped with 2-propanol. The coating solution was spin applied onto un-primed plaques and cured with H bulb with UVA dosage of 1 J/cm$^2$ and intensity of 0.6 W/cm$^2$ under air. Samples with final dry film thickness ranging from 10-20 μm were prepared. Coated samples were evaluated for adhesion, optical clarity and Taber abrasion resistance.

As demonstrated in Table 4, polycarbonate samples coated with coatings of the present invention were highly transparent with low initial haze with different levels of bio-content. Especially for example 5, better abrasion resistance was achieved with over 20% bio-content. These bio-based coatings also provided good adhesion and abrasion resistance.

TABLE 4

| | Results | | |
|---|---|---|---|
| Testing | Example 3 | Example 4 | Example 5 |
| Bio Content[13] | 29.63 | 26.49 | 23.15 |
| Film Thickness (μm) | 12.5~13.0 | 12.5~13.0 | 12.5 |
| Adhesion[14] | 5 | 5 | 5 |
| Initial Haze %[15] | 2.11 | 0.288 | 0.41 |
| Haze % after 100 cycles of Taber Abrasion[16] | 11.39 | 8.18 | 7.10 |
| Haze % after 300 cycles of Taber Abrasion | 20.39 | 16.28 | 8.93 |

[13]Bio-content: the percent of weight of bio-material over total coating weight in the dry film.
[14]Adhesion: Crosshatch, Nichiban LP-24 adhesive tape. Rating scale 0-5 (no adhesion - 100% adhesion after tape pull).
[15]Haze % was measured with Hunter Lab spectrophotometer.
[16]Taber Abrasion: Taber 5150 Abrader, CS-10 wheels, S-11 refacing disk, 500 grams of weight. Haze % was measured after 300 Taber cycles. Haze % <25% after 300 Taber cycles is acceptable.

Example 6, 7, 8

Standard bio-based coating compositions of examples 6, 7, and 8 were prepared from the ingredients listed in Table 5. Charge I was added to a suitable flask and stirred. Charge II was then added to the flask followed by Charge III and IV under agitation. The mixture was stirred for appropriate time to form a clear solution.

TABLE 5

| | | Formula Weight (g) | | |
|---|---|---|---|---|
| Charge | Component | Example 6 | Example 7 | Example 8 |
| I | Urethane Acrylate 4 from Example 2 | 126.21 | — | — |
| | Urethane Acrylate 3 from Example 2 | — | 80.8 | — |
| | Urethane Acrylate 2 from Example 2 | — | — | 80.8 |
| | SARTOMER SR399[17] | 32.12 | 19.40 | 19.40 |
| | SARTOMER SR454[18] | 40.15 | 15.40 | 15.40 |
| II | DARACURE 1173 | 3.21 | 1.60 | 1.60 |
| | IRGACURE 184 | 3.21 | 1.60 | 1.60 |
| | GENOCURE MBF | 0 | 0 | 0 |
| | Benzophenone | 0 | 0 | 0 |
| III | PM Acetate | 22.93 | 11.42 | 11.42 |
| | n-butyl acetate | 82.31 | 40.00 | 40.00 |
| | Isobutanol | 57.37 | 28.58 | 28.58 |
| IV | DG57[19] | 2.01 | 1.20 | 1.20 |

[17]Dipentaerythritol pentaacrylate commercially available from Sartomer Company, Inc., Exton, PA.
[18]Ethoxylated trimethylolpropane triacrylate commercially available from Sartomer Company, Inc., Exton, PA.
[19]Flow modifier commercially available from Dow Corning.

To coat samples with foregoing composition, MAKROLON transparent polycarbonate plaques (Bayer AG) were wiped with 2-propanol. The coating solution was spin applied onto un-primed plaques and cured with H bulb with UVA dosage of 1 J/cm$^2$ and intensity of 0.6 W/cm$^2$ under air. Samples with final dry film thickness ranging from 15-18 μm were prepared. Coated samples were evaluated for adhesion, optical clarity and Taber abrasion resistance.

As demonstrated in Table 6, polycarbonate samples were coated with these bio-based UV clear coats. These coatings with different levels of bio-content in this invention were highly transparent with low initial haze, and they had good adhesion and abrasion resistance.

TABLE 6

| Testing | Results | | |
|---|---|---|---|
| | Example 6 | Example 7 | Example 8 |
| Bio Content | 42.14 | 37.67 | 32.98 |
| Film Thickness (μm) | 17.5-20.0 | 15~17.5 | 15 |
| Adhesion | 5 | 5 | 5 |
| Initial Haze | 0.26 | 0.12 | 0.24 |
| Haze % after 100 cycles of Taber Abrasion | 13.42 | 10.37 | 10.34 |
| Haze % after 300 cycles of Taber Abrasion | 31.46 | 22.2 | 24.33 |

Example 9

A coating composition was prepared from the ingredients listed in Table 7. Charge I was added to a suitable flask and stirred. Charge II was then added to the flask followed by Charge III and IV under agitation. The mixture was stirred for appropriate time to form a clear solution.

TABLE 7

| Charge | Component | Formula Weight (g) Example 9 |
|---|---|---|
| I | Urethane Acrylate 1 from Example 2 | 39.40 |
| | SARTOMER SR399[20] | 8.70 |
| | SARTOMER SR454[21] | 9.70 |
| II | DARACURE 1173 | 0.80 |
| | IRGACURE 184 | 0.80 |
| III | PM Acetate | 5.71 |
| | n-butyl acetate | 20.00 |
| | Isobutanol | 14.29 |
| IV | DG57[22] | 0.60 |
| | VERSAFLOW 102[23] | 0.05 |

[20]Dipentaerythritol pentaacrylate commercially available from Sartomer Company, Inc., Exton, PA.
[21]Ethoxylated trimethylolpropane triacrylate commercially available from Sartomer Company, Inc., Exton, PA.
[22]Flow modifier commercially available from Dow Corning.
[23]Flow modifier commercially available from Shamrock Technologies.

To coat samples with the foregoing composition, MAKROLON transparent polycarbonate plaques (Bayer AG) were wiped with 2-propanol. The coating solution was spin applied onto un-primed plaques and cured with H bulb with UVA dosage of 1 J/cm$^2$ and intensity of 0.6 W/cm$^2$ under air. Samples with final dry film thickness ranging from 15-18 μm were prepared. Coated samples were evaluated for adhesion, optical clarity and Taber abrasion resistance.

As demonstrated in Table 8, polycarbonate samples coated with the Example 9 composition (which did not include any abrasion resistant particles), provided a cured coating exhibiting initial clarity and abrasion resistance properties comparable to a commercial radiation curable composition comprising such particles

TABLE 8

| Testing | Results | |
|---|---|---|
| | Example 9 | Commercial Control[24] |
| Bio Content | 42.14 | 0 |
| Film Thickness (μm) | 15~20 | 15~20 |
| Adhesion | 3 | 5 |
| Initial Haze | 0.84 | 0.17 |
| Haze % after 100 cycles of Taber Abrasion | 8.58 | 10.07 |
| Haze % after 300 cycles of Taber Abrasion | 16.40 | 16.04 |

[24]Commercial radiation-curable formula containing abrasion resistant particles, available from PPG Industries, Inc.

Whereas particular embodiments of this invention have been described above for purposes of illustration, it will be evident to those skilled in the art that numerous variations of the details of the present invention may be made without departing from the invention as defined in the appended claims.

The invention claimed is:

1. A radiation curable liquid coating comprising:
    i) the reaction product of
        a) a polyol; and
        b) a polycarboxylic acid/anhydride; further reacted with
        c) a compound having a radiation curable moiety comprising acryloyl isocyanate;
    wherein at least some of a) and/or b) are biomass derived, wherein the polyol is not a condensation reaction product of an acid functional compound and a hydroxy functional compound, and the reaction product comprises ethylenic unsaturation that is derived from b), and b has more than four carbons, and wherein the weight % of b) is 24 to 39 based upon the total weight of the reaction product; and
    ii) a highly functional (meth)acrylate.

2. The coating of claim 1, wherein the polyol comprises 1,3-propanediol.

3. The coating of claim 2, wherein the polyol further comprises glycerol.

4. The coating of claim 3, wherein the polycarboxylic acid/anhydride comprises itaconic acid/anhydride.

5. The coating of claim 1, wherein the reaction product is further reacted with a hydroxyl carboxylic acid.

6. The coating of claim 5, wherein the hydroxyl carboxylic acid comprises 12-hydroxy stearic acid.

7. The coating of claim 1, wherein the acryloyl isocyanate comprises acryloyl oxyethyl isocyanate.

8. The coating composition of claim 1, further comprising abrasion resistant particles.

9. The coating of claim 1, wherein the coating is a dual cure coating.

10. The coating of claim 1, wherein the coating is a clearcoat.

11. The coating of claim 1, wherein the coating comprises 15 weight percent or greater biomass derived product.

12. A substrate coated at least in part with the coating of claim 1.

13. The coating composition of claim 8, wherein the abrasion resistant particles comprise silica nanoparticles.

* * * * *